US012563477B2

(12) United States Patent
Kumagai et al.

(10) Patent No.: US 12,563,477 B2
(45) Date of Patent: Feb. 24, 2026

(54) TERMINAL, BASE STATION, AND COMMUNICATION METHOD FOR REQUESTING A CELL SEARCH SIGNAL

(71) Applicant: NTT DOCOMO, INC., Tokyo (JP)

(72) Inventors: Shinya Kumagai, Tokyo (JP); Mayuko Okano, Tokyo (JP); Masaya Okamura, Tokyo (JP); Yuki Takahashi, Tokyo (JP); Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 313 days.

(21) Appl. No.: 18/264,309

(22) PCT Filed: Mar. 24, 2021

(86) PCT No.: PCT/JP2021/012417
§ 371 (c)(1),
(2) Date: Aug. 4, 2023

(87) PCT Pub. No.: WO2022/201402
PCT Pub. Date: Sep. 29, 2022

(65) Prior Publication Data
US 2024/0040486 A1     Feb. 1, 2024

(51) Int. Cl.
| | |
|---|---|
| *H04W 48/12* | (2009.01) |
| *H04W 48/14* | (2009.01) |
| *H04W 48/16* | (2009.01) |
| *H04W 48/18* | (2009.01) |
| *H04W 48/20* | (2009.01) |
| *H04W 64/00* | (2009.01) |
| *H04W 88/06* | (2009.01) |

(52) U.S. Cl.
CPC ......... *H04W 48/14* (2013.01); *H04W 64/003* (2013.01)

(58) Field of Classification Search
CPC ..... H04W 48/14; H04W 76/15; H04W 48/16; H04W 64/003; H04B 7/06952; H04L 5/0048
USPC ......................................................... 455/434
See application file for complete search history.

(56) References Cited

U.S. PATENT DOCUMENTS

2015/0173004 A1* 6/2015 Nigam ................ H04W 56/001
                                                    370/331
2016/0128006 A1    5/2016 Ji et al.
                        (Continued)

FOREIGN PATENT DOCUMENTS

| JP | 2010-109534 A | 5/2010 |
|---|---|---|
| JP | 2015-053615 A | 3/2015 |

(Continued)

OTHER PUBLICATIONS

IP.com search History (Year: 2025).*

(Continued)

*Primary Examiner* — Moustapha Diaby
(74) *Attorney, Agent, or Firm* — Osha Bergman Watanabe & Burton LLP

(57) ABSTRACT

A terminal has: a transmitting unit configured to transmit, to a communication device, a requesting signal that requests transmission of a cell search signal; and a receiving unit configured to receive the cell search signal transmitted based on the requesting signal and identify information related to a cell.

5 Claims, 11 Drawing Sheets

(56) References Cited

U.S. PATENT DOCUMENTS

| | | | |
|---|---|---|---|
| 2016/0234736 A1 | 8/2016 | Kubota et al. | |
| 2018/0198583 A1 | 7/2018 | Lin et al. | |
| 2020/0092777 A1 | 3/2020 | Agiwal et al. | |
| 2023/0188195 A1* | 6/2023 | Wang | H04B 7/06964 |
| | | | 375/262 |

FOREIGN PATENT DOCUMENTS

| | | |
|---|---|---|
| JP | 2016129434 A | 7/2016 |
| JP | 2018511961 A | 4/2018 |
| WO | 2020029200 A1 | 2/2020 |

OTHER PUBLICATIONS

Office Action issued in Japanese Patent Application No. 2023-508294, mailed on Feb. 4, 2025 (6 pages).

3GPP TS 38.300 V16.4.0; "3rd Generation Partnership Project; Technical Specification Group Radio Access Network; NR; NR and NG-RAN Overall Description; Stage 2 (Release 16)"; Dec. 2020 (149 pages).
NTT Docomo, Inc.; White Paper "5G Evolution and 6G"; Jan. 2020 (34 pages).
International Search Report issued in PCT/JP2021/012417 on Oct. 26, 2021 (5 pages).
Written Opinion of the International Searching Authority issued in PCT/JP2021/012417 on Oct. 26, 2021 (4 pages).
Ericsson: "UE specific Beamforming with Aperiodic CSI-RS Transmission"; 3GPP TSG-RAN WG1 #86, R1-167637, Gothenburg, Sweden, Aug. 22-26, 2016 (6 pages).
Extended European Search Report issued in Application No. 21933012.3, mailed Nov. 29, 2024 (12 pages).
Office Action issued in counterpart Japanese Patent Application No. 2023-508294 mailed on Jul. 8, 2025 (5 pages).

* cited by examiner

FIG.5

TIME

TRANSMITTING NODE

RECEIVING NODE

PREAMBLE

TRANSMITTING SIGNAL

DETECTION

DEMODULATION

S43: NOTICE OF RECEPTION

10A

S41: LOCATION INFORMATION OF BASE STATION 10A

10B

20A

20B

S42: REQUEST SIGNAL

TERMINAL, BASE STATION, AND COMMUNICATION METHOD FOR REQUESTING A CELL SEARCH SIGNAL

FIELD OF THE INVENTION

The present invention relates to a terminal, a base station, and a communication method in a wireless communication system.

BACKGROUND OF THE INVENTION

In the 3rd generation partnership project (3GPP), a wireless communication scheme called "5G" or "New Radio (NR)" (hereinafter this new communication scheme will be referred to as "NR") is being discussed in order to realize further increase of system capacity, further increase of data transmission speed, and further decrease of delay in wireless sections. In 5G, various wireless technologies and network architectures are being discussed in order to satisfy the requirements of achieving a throughput of 10 Gbps or more and keeping the delay in wireless areas to 1 ms or less (see, for example, Non-Patent Document 1).

Furthermore, studies on 6G as a next-generation wireless communication scheme following 5G have started, and realizing wireless quality exceeding that of 5G is expected. For example, studies on 6G are in progress to realize further increase of capacity, use of new frequency bands, further reduction of delay, higher reliability, expansion of coverage in new areas (high altitude, sea, outer space, etc.), and so forth (see, for example, Non-Patent Document 2).

Related-Art Documents

Non-Patent Documents

[Non-Patent Document 1] 3GPP TS 38.300 V16.4.0 (2020-12)
[Non-Patent Document 2] NTT DOCOMO, INC. White Paper: Evolution and 6G (2020-01)

SUMMARY OF THE INVENTION

Technical Problem

In 6G, frequencies higher than heretofore might be used for further improvement of communication speed, capacity, reliability, delay performance, and so forth. Characteristics that are demonstrated when such high frequencies are used include that a wide bandwidth can be used, that the straightness of radio waves is high, and that the frequency selectivity is low. Also, large Doppler shift and large path loss are additional examples of such characteristics.

Given these characteristics of frequency bands when high frequencies are used, control rules that are different from conventional cell design or scheduling techniques by base stations may be more desirable from the perspective of network performance. For example, since the probability of resource collision is likely to be lower than in the past, a system in which a terminal or a base station autonomously determines the resources to use for transmission may be possible. In this system, many narrow beams may be used in order to compensate for the path loss due to the use of high frequency bands. However, since the number of synchronization signals or reference signals that need to be transmitted increases in proportion to the number of beams used, the signaling overhead also increases.

The present invention has been made in view of the above, and an object of the present invention is therefore to reduce the signaling overhead in a wireless communication system in which the resources to be used are determined autonomously.

Solution to Problem

According to the disclosed technique, a terminal is provided. This terminal has: a transmitting unit configured to transmit a signal that requests transmission of a cell search signal, to a communication device; and a receiving unit configured to receive the cell search signal transmitted based on the requesting signal and identify information related to a cell.

Advantageous Effects of Invention

According to the disclosed technique, signaling overhead can be reduced in a wireless communication system in which the resources to be used are determined autonomously.

BRIEF DESCRIPTION OF THE DRAWINGS

FIG. 5 is a diagram that illustrates an example (2) of transmission and reception according to an embodiment of the present invention;

FIG. 10 is a diagram that illustrates an example (2) of requesting a cell search signal according to an embodiment of the present invention;

DETAILED DESCRIPTION OF THE PREFERRED EMBODIMENTS

Hereinafter, an embodiment of the present invention will be described with reference to the accompanying drawings. The embodiment described below is an example, and the embodiments to which the present invention can be applied are by no means limited to the following embodiment.

Existing technologies may be used as appropriate for the operation of the wireless communication system according to the following embodiment of the present invention. The existing technologies include, for example, existing NR or LTE, but are by no means limited to existing NR or LTE.

Figure 1:
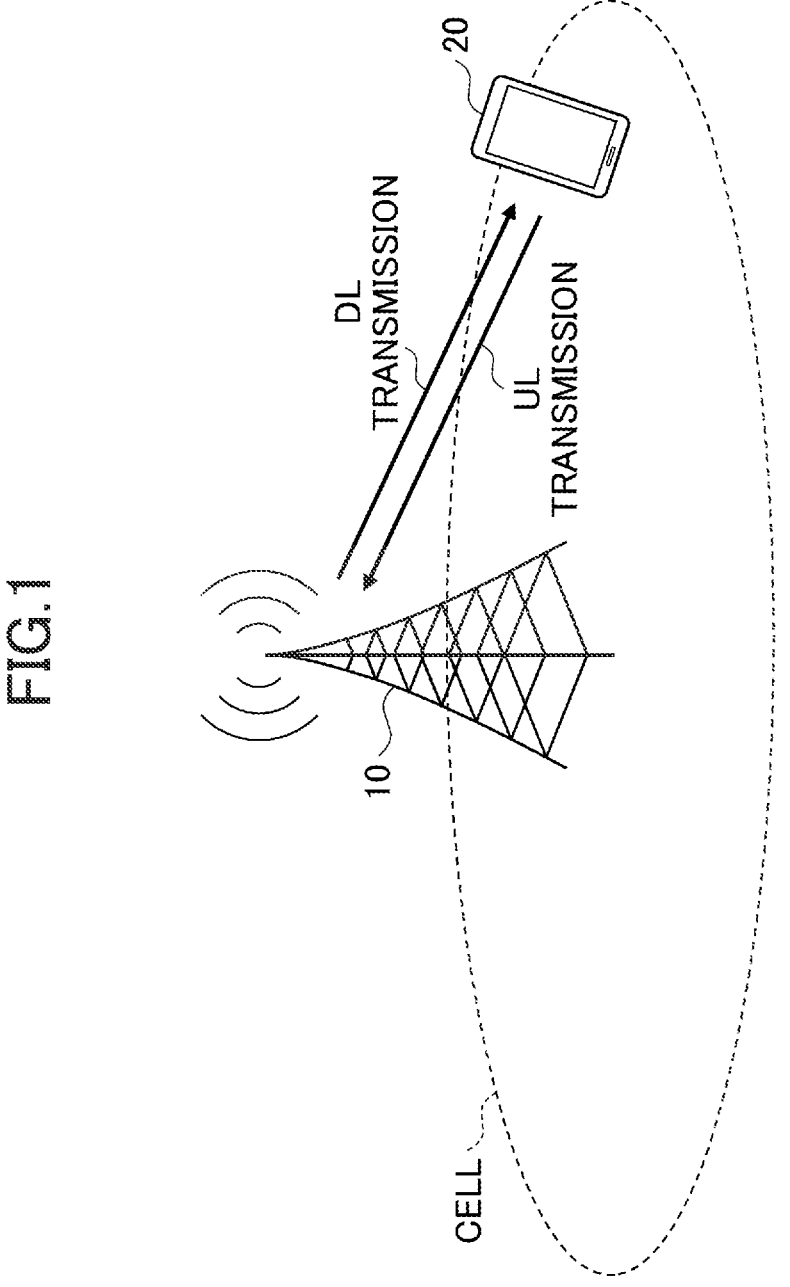
FIG. 1 is a diagram that illustrates an example (1) of a wireless communication system according to an embodiment of the present invention.

FIG. 1 is a diagram that illustrates an example (1) of a wireless communication system according to an embodiment of the present invention. The wireless communication system according to the embodiment of the present invention includes a base station 10 and a terminal 20, as illustrated in FIG. 1. In FIG. 1, one base station 10 and one terminal 20 are illustrated, but this is an example, and there may be more than one of each.

The base station 10 is a communication device that provides one or more cells and performs wireless communication with the terminal 20. The physical resources of radio signals are defined in the time domain and the frequency domain. The time domain resources may be defined or referred to as orthogonal frequency division multiplexing (OFDM) symbols, and the frequency domain resources may be defined or referred to as sub-carriers or resource blocks. Also, the transmission time interval (TTI) in the time domain may be a slot or a subframe.

The base station 10 can perform carrier aggregation to communicate with the terminal 20 by bundling multiple cells (multiple component carriers (CCs)). Carrier aggregation uses one primary cell (PCell) and one or more secondary cells (SCells).

The base station 10 transmits synchronization signals, system information, and so forth to the terminal 20. The synchronization signals are, for example, the primary synchronization signal (NR-PSS) and the secondary synchronization signal (NR-SSS). The system information is transmitted, for example, by NR-PBCH or PDSCH, and is also referred to as "broadcast information." As illustrated in FIG. 1, the base station 10 transmits control signals or data to the terminal 20 in the downlink (DL), and receives control signals or data from the terminal 20 in the uplink (UL). Here, although what is transmitted via control channels such as PUCCH and PDCCH is referred to as "control signals" and what is transmitted via shared channels such as PUSCH and PDSCH is referred to as "data," these names are only examples.

The terminal 20 is a communication device with a wireless communication function, such as a smartphone, a cellular phone, a tablet, a wearable terminal, or a machine-to-machine (M2M) communication module. As illustrated in FIG. 1, the terminal 20 utilizes various communication services provided by a wireless communication system by receiving control signals or data from the base station 10 in DL and by transmitting control signals or data to the base station 10 in UL. Note that the terminal 20 may be referred to as a "UE," and the base station 10 may be referred to as a "gNB."

The terminal 20 can perform carrier aggregation to communicate with the base station 10 by bundling multiple cells (multiple CCs). Carrier aggregation uses one PCell and one or more SCells. Also, PUCCH-SCell with PUCCH may be used.

Figure 2:
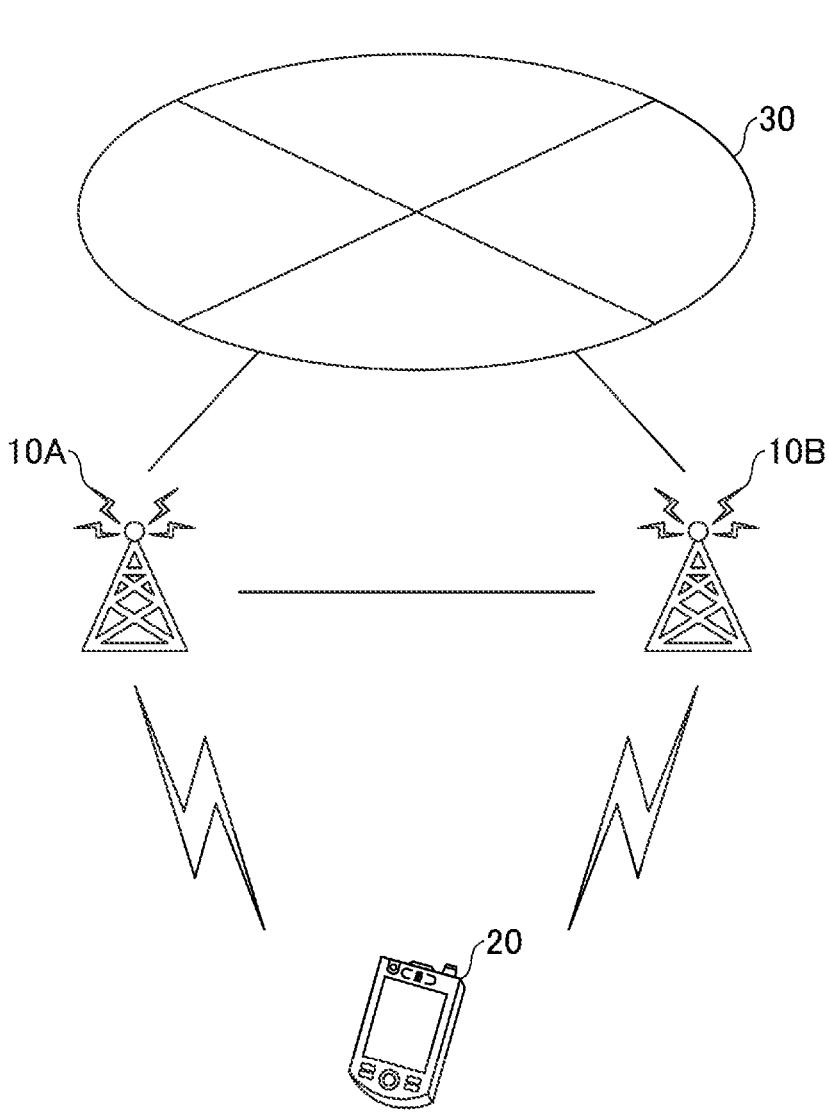
FIG. 2 is a diagram that illustrates an example (2) of a wireless communication system according to an embodiment of the present invention.

FIG. 2 is a diagram for explaining an example (2) of the wireless communication system according to an embodiment of the present invention. FIG. 2 shows an example structure of a wireless communication system in which dual connectivity (DC) is employed. As illustrated in FIG. 2, a base station 10A that serves as a master node (MN) and a base station 10B that serves as a secondary node (SN) are provided. The base station and the base station 10B are both connected to a core network. The terminal 20 can communicate with both the base station 10A and the base station 10B.

The cell group provided by the base station that serves as the MN is referred to as a "master cell group" (MCG), and the cell group provided by the base station 10B that serves as the SN is referred to as a "secondary cell group" (SCG). Also, in DC, the MCG is composed of one PCell and one or more SCells, and the SCG is composed of one primary SCG cell (PSCell) and one or more SCells.

Note that DC may be a communication method in compliance with two communication standards, and any combination of communication standards is possible. For example, either NR and 6G standards may be combined, or LTE and 6G standards may be combined. Also, DC may be a communication method in compliance with three or more communication standards, and may be referred to by a name other than DC.

The processes and operations according to the present embodiment may be executed in the system structure illustrated in FIG. 1, may be executed in the system structure illustrated in FIG. 2, or may be executed in a system structure other than these.

Now, in 6G, frequencies higher than heretofore might be used for further improvement of communication speed, capacity, reliability, delay performance, and so forth. Characteristics that are demonstrated when such high frequencies are used include that a wide bandwidth can be used, that the straightness of radio waves is high, and that the frequency selectivity is low. Also, large Doppler shift and large path loss are additional examples of such characteristics.

Given these characteristics of frequency bands when high frequencies are used, control rules that are different from conventional cell design or scheduling techniques by base stations may be more desirable from the perspective of network performance. For example, DL-DL, DL-UL, and UL-UL collision avoidance and inter-cell interference reduction may be less necessary than in low frequencies used heretofore.

Figure 3:
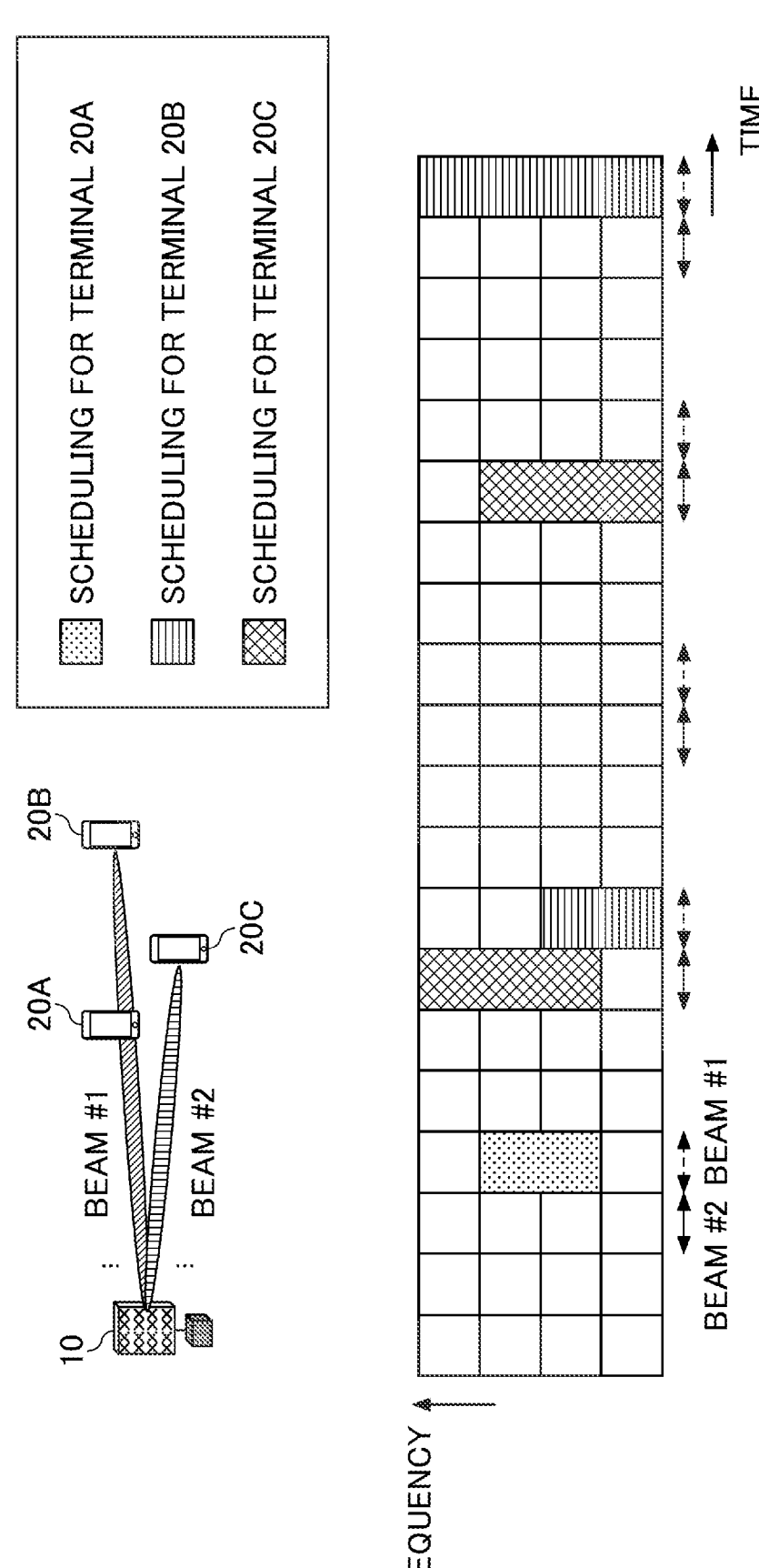
FIG. 3 is a diagram that illustrates an example of scheduling.

FIG. 3 is a diagram that illustrates an example of scheduling. In the example illustrated in FIG. 3, analog beamforming of the base station 10 is realized, and scheduling is performed based on time division multiplexing (TDM) for each beam. As illustrated in FIG. 3, beam #1 and beam #2 are multiplexed by TDM. In the example illustrated in FIG. 3, the base station 10 performs TDM-based scheduling for the terminals 20A and 20B that use beam #1 and for the terminal 20C that uses beam #2.

As control rules that do not rely on scheduling, for example, a control rule (A) and a control rule (B) shown below may be used:

Control Rule (A):

The transmitting device, either the base station or the terminal 20, transmits signals at freely-selected timings. The receiving device, either the base station 10 or the terminal 20, needs to detect signals at all possible receiving timings. If the resources to use for transmission collide, the collision is treated the same as a decoding error, and feedback-triggered retransmission may be performed. In a frequency band using a higher frequency than heretofore, the beams are very narrow and the area is narrow. It then follows that the number of terminals located in a given beam is very small, and, even if scheduling is not executed by the base station 10, the probability of collision of resources used for transmission is likely to be low.

Control Rule (B):

The transmitting device, either the base station 10 or the terminal 20, acquires the right for transmission and transmits signals. That is, the base station 10 and the terminal 20 transmit signals after executing intra-system listen before talk (LBT). The receiving device, either the base station 10 or the terminal 20, needs to detect signals at all possible receiving timings. Collisions of resources used for transmission can be avoided by performing intra-system LBT. In a frequency band using a higher frequency than heretofore, the probability of resource collisions is low, and, in addition to this, control rule B can ensure operations in which resource collisions that rarely occur due to interference within the same beam or between cells can be detected in advance and avoided.

For each of control rule A and control rule B, a case with frame synchronization and a case without frame synchronization may be considered. Hereinafter, control rules with frame synchronization will be referred to as a "control rule A1" and a "control rule B1," and control rules without frame synchronization will be referred to as a "control rule A2" and a "control rule B2."

The transmission procedures and signal detection procedures in above control rule A1, control rule A2, control rule B1, and control rule B2 need to be considered. Also, intra-system LBT in above control rule B1 and control rule B2 needs to be considered. As for the elements of intra-system LBT, the possible transmission time, semi-static transmission without LBT, and frequency resource collision avoidance need to be considered. Also, for above control rule A2 and control rule B2, the use of preambles needs to be considered. Also, for above control rule A1 and control rule B1, it is necessary to consider blind detection of control signals.

Note that, hereinafter, the transmitting node or the receiving node corresponds to either the base station 10 or the terminal 20.

Figure 4:
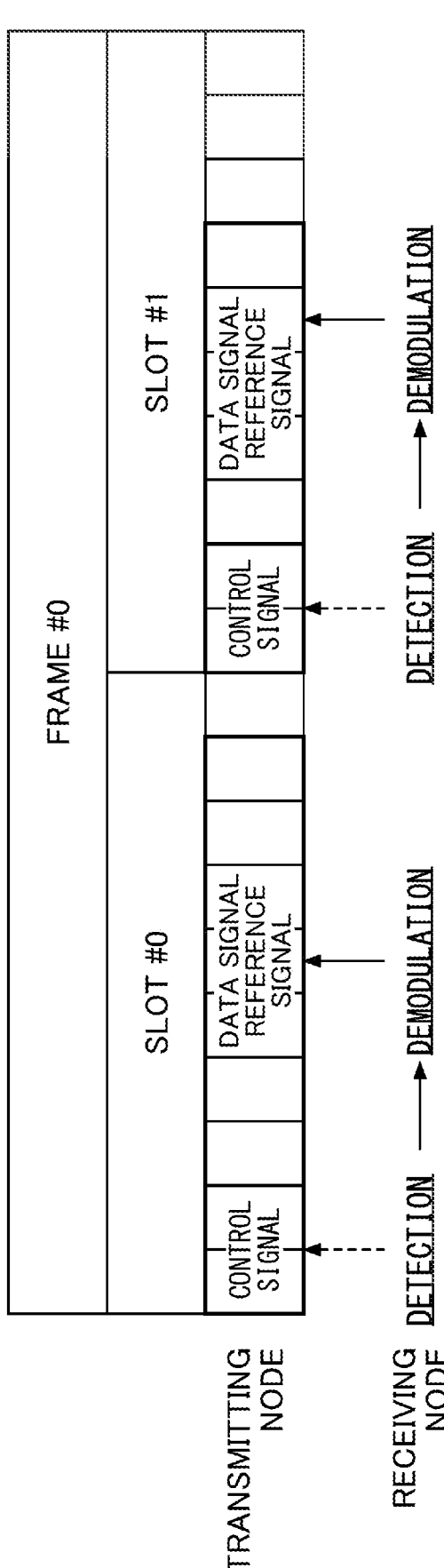
FIG. 4 is a diagram that illustrates an example (1) of transmission and reception according to an embodiment of the present invention.

FIG. 4 is a diagram that illustrates an example (1) of transmission and reception according to an embodiment of the present invention. Procedures relating to above control rule A1 will be described below with reference to FIG. 4. In above control rule A1, the following operations (1) to (4) may be executed.

(1) The transmitting node may transmit a signal at a predetermined transmission timing. The transmitting signal may include at least one of a data signal, a control signal, and a reference signal. The predetermined transmission timing may be determined based on a frame that is synchronized between the transmitting/receiving nodes.

(2) When the transmitting node transmits a number of signals continuously, except for the first transmission, the timing for transmitting a signal may be determined based on the signal transmitted immediately before. For example, the transmission timings and the duration of transmission for signals other than the signal of the first transmission may be commanded to the transmitting node or configured in advance in the transmitting node, or may be notified to the receiving node or configured in advance in the receiving node. For example, the transmission timing of a transmission other than the first transmission may be x symbols after the end of the signal transmitted immediately before, y slots after the end of the signal transmitted immediately before, z frames after the end of the signal transmitted immediately before, or may be a combination of x, y, and z. For example, the duration of transmission in transmissions other than the first transmission may be L symbols long from the x-th symbol in each slot.

In the example illustrated in FIG. 4, assuming that the first transmission is performed in slot #0, the transmission in slot #1 is carried out at a timing one symbol after the end of the signal transmitted immediately before, with its transmission timing and duration of transmission being the 0th symbol of the slot and 7 symbols long, respectively.

(3) The receiving node may perform blind detection of the control signals. Control signal resources or detection opportunities (for example, a control resource set (CORESET) or search space) may be defined in the technical specifications, or may be configured or notified from the transmitting node. For example, in FIG. 4, the receiving node performs blind detection for the control signal transmitted in the first two symbols of the slot.

(4) The receiving node may demodulate the data signal upon detection of the control signal. The receiving node may specify the data and/or reference signal resources based on the detection result of the control signal. For example, referring to FIG. 4, when the receiving node detects the control signal transmitted in the first two symbols of the slot, the receiving node may demodulate the subsequent data signal and/or reference signal.

Note that the correspondence between the transmitting/receiving nodes is as follows. In the downlink, the base station 10 is the transmitting node, and the terminal 20 is the receiving node. In the uplink, the terminal 20 is the transmitting node, and the base station 10 is the receiving node. In the sidelink, the terminal 20 is the transmitting node, and the terminal 20 is the receiving node.

Figure 5:
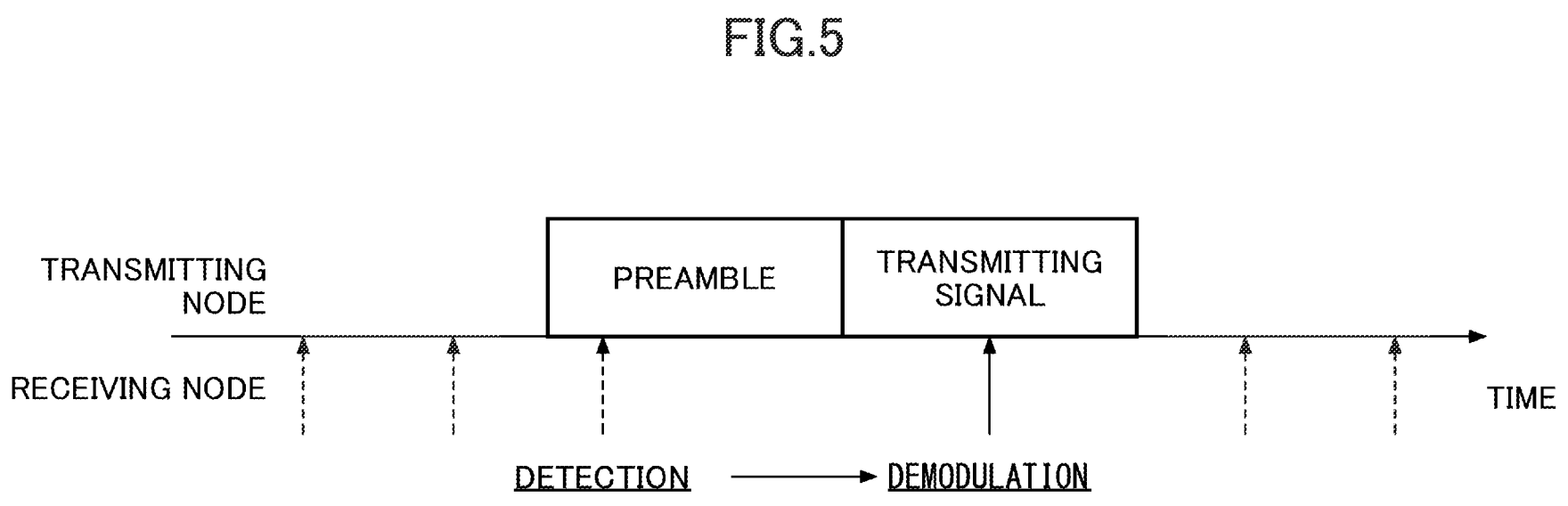

FIG. 5 is a diagram that illustrates an example (2) of transmission and reception according to an embodiment of the present invention. Procedures pertaining to above control rule A2 will be described below with reference to FIG. 5. The following operations (1) to (4) may be executed in above control rule A2.

(1) As illustrated in FIG. 5, the transmitting node may attach a preamble signal to a transmitting signal and transmit it. The transmitting signal may include at least one of a data signal, a control signal, and a reference signal. The transmitting node may start transmitting the signal at any timing.

(2) In the event the transmitting node transmits a number of signals continuously and the gap between the transmitting signals is less than or equal to a predetermined value, the transmitting node need not attach the preamble signal in transmissions other than the first transmission. The predetermined value may be a threshold. Except for the first transmission, the timing for transmitting a signal may be determined based on the immediately preceding transmitting signal. For example, the next signal may start being transmitted X milliseconds after the end of the signal transmitted immediately before.

(3) The receiving node may detect the preamble signal. The receiving node may determine that a preamble is detected when the receiving power of the preamble signal is greater than or equal to a predetermined value.

(4) The receiving node may demodulate the transmitting signal upon detecting the preamble signal. The receiving node may specify the resources of the transmitting signal based on the preamble signal's detection result. The receiving node may specify the control signal's resources or detection opportunities (for example, a CORESET or search space) based on the detection result of the preamble signal, and perform blind detection for the control signal. Furthermore, the receiving node may demodulate the data signal upon detecting the control signal. The receiving node may specify the data and/or reference signal resources from the detection result of the control signal.

Figure 6:
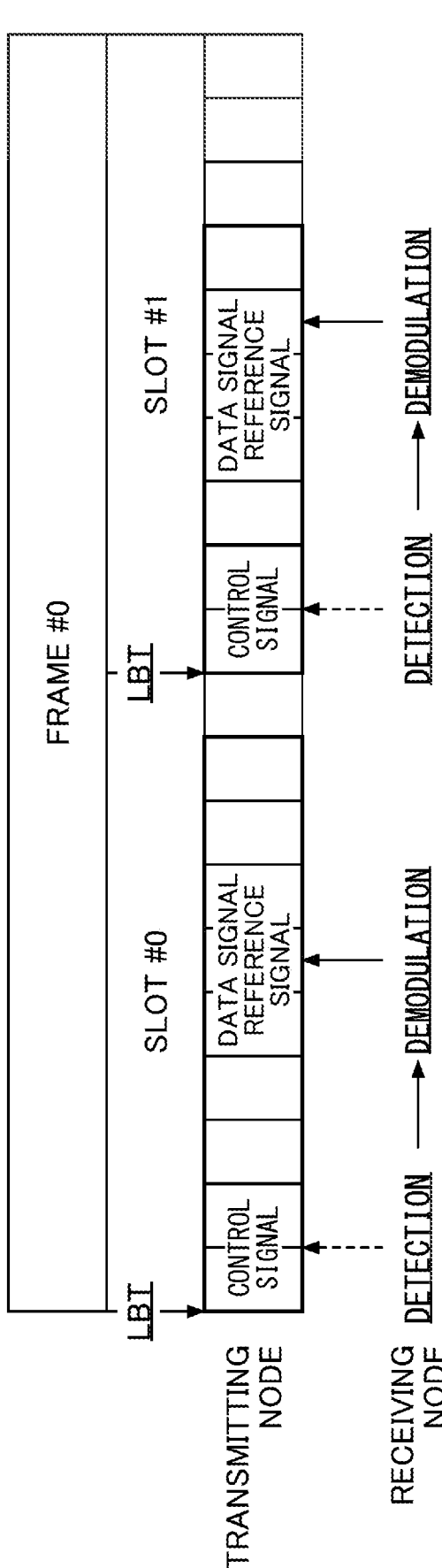
FIG. 6 is a diagram that illustrates an example (3) of transmission and reception according to an embodiment of the present invention.

FIG. 6 is a diagram that illustrates an example (3) of transmission and reception according to an embodiment of the present invention. Procedures pertaining to above control rule B1 will be described with reference to FIG. 6. In above control rule B1, the following operations (1) to (4) may be executed.

(1) The transmitting node may transmit a transmitting signal when LBT succeeds at a predetermined transmission timing. For example, as illustrated in FIG. 6, LBT may be performed until shortly before a signal-transmitting slot. The transmitting signal may include at least one of a data signal, a control signal, and a reference signal. The predetermined transmission timing may be determined based on a frame that is synchronized between the transmitting/receiving nodes. When LBT is performed, the power may be detected in a predetermined time period immediately before the transmitting signal is transmitted, and it may be determined that LBT succeeded if the receiving power there is less than or equal to a predetermined value. The predetermined value may be a threshold. When LBT fails, LBT may be performed again shortly before a predetermined transmission timing. Alternatively, the timing for repeating LBT until LBT succeeds may be specified in the technical specifications, or may be configured or notified in advance from the receiving node. Note that, if the transmitting node performs LBT again and succeeds, the transmitting node may transmit the same transmitting signal as when LBT failed, or the transmitting node may transmit a different transmitting signal than when LBT failed.

(2) In the event the transmitting node transmits a number of signals continuously and the gap between transmitting signals is less than or equal to a predetermined value, the transmitting node may not perform LBT except upon the first transmission. That is, if the gap between a signal that has been transmitted and the signal that is going to be transmitted next is less than or equal to a predetermined value, then the next signal may be transmitted without performing LBT. The predetermined value may be a threshold. In the event LBT succeeds when a number of signals are transmitted continuously, the transmitting node may perform transmission without performing LBT for a predetermined period of time. When a plurality of transmitting signals are transmitted continuously, except for the first transmission, the timing for transmitting a signal may be determined based on the signal transmitted immediately before. When a number of transmitting signals are transmitted continuously, the transmission timings and the duration of transmission for signals other than the signal of the first transmission may be commanded to the transmitting node or configured in advance in the transmitting node, or may be notified to the receiving node or configured in advance in the receiving node. For example, the transmission timing of a transmission other than the first transmission may be x symbols after the end of the signal transmitted immediately before, y slots after the end of the signal transmitted immediately before, z frames after the end of the signal transmitted immediately before, or may be a combination of x, y, and z. For example, the duration of transmission in transmissions other than the first transmission may be L symbols long from the x-th symbol in each slot.

(3) The receiving node may perform blind detection of the control signals. Control signal resources or detection opportunities (for example, a CORESET or search space) may be defined in the technical specifications, or may be configured or notified from the transmitting node. For example, in FIG. 6, the receiving node performs blind detection for the control signal transmitted in the first two symbols of the slot.

(4) The receiving node may demodulate the data signal upon detection of the control signal. The receiving node may specify the data and/or reference signal resources based on the detection result of the control signal. For example, referring to FIG. 6, when the receiving node detects the control signal transmitted in the first two symbols of the slot, the receiving node may demodulate the subsequent data signal and/or reference signal.

Figure 7:
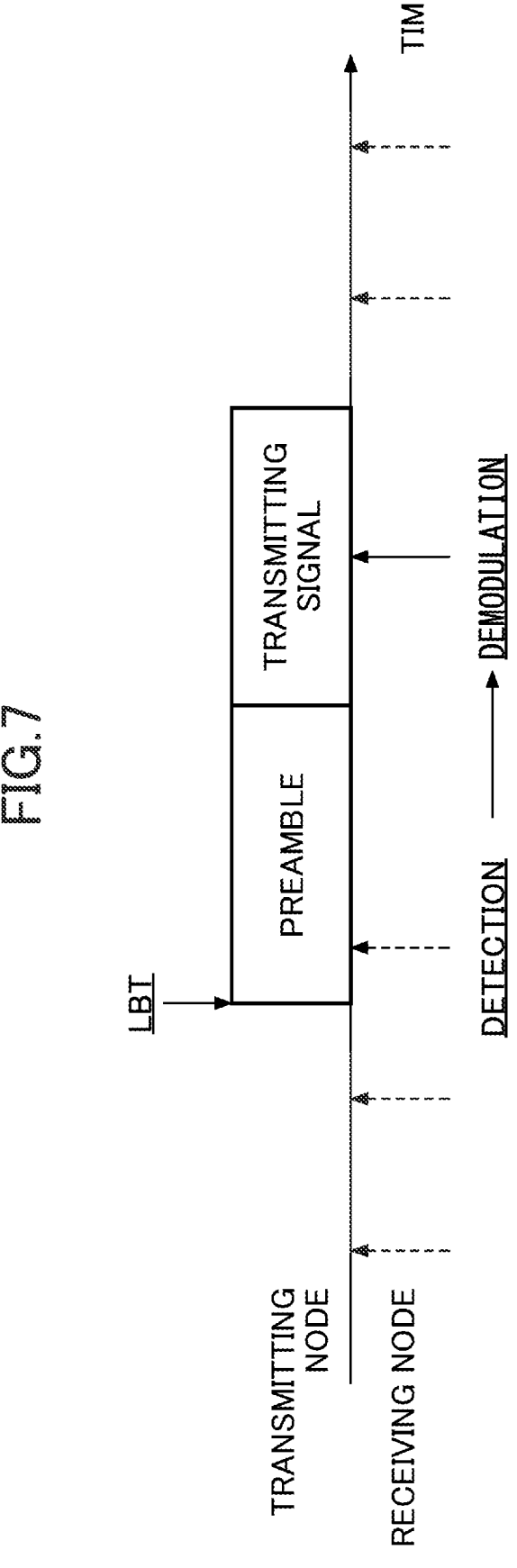
FIG. 7 is a diagram that illustrates an example (4) of transmission and reception according to an embodiment of the present invention.

FIG. 7 is a diagram that illustrates an example (4) of transmission and reception according to an embodiment of the present invention. Procedures pertaining to above control rule B2 will be described below with reference to FIG. 7. In above control rule B2, the following operations (1) to (4) may be executed.

(1) The transmitting node may transmit a transmitting signal by adding a preamble signal to the transmitting signal when LBT succeeds. For example, as illustrated in FIG. 7, LBT may be performed until shortly before the preamble signal is transmitted. The transmitting signal may include at least one of a data signal, a control signal, and a reference signal. The transmitting node may start LBT and transmission at any timing. When LBT is performed, the power may be detected in a predetermined time period immediately before the preamble signal is transmitted, and it may be determined that LBT succeeded if the receiving power there is less than or equal to a predetermined value. The predetermined value may be a threshold. When LBT fails, LBT may be performed again shortly before a given transmission timing. Alternatively, the timing for repeating LBT until LBT succeeds may be specified in the technical specifications, or may be configured or notified in advance from the receiving node. Note that, if the transmitting node performs LBT again and succeeds, the transmitting node may transmit the same transmitting signal as when LBT failed, or the transmitting node may transmit a different transmitting signal than when LBT failed.

(2) In the event the transmitting node transmits a number of signals continuously and the gap between the transmitting signals is less than or equal to a predetermined value, the transmitting node may not add a preamble signal except upon the first transmission. The predetermined value may be a threshold. In the event LBT succeeds when a number of signals are transmitted continuously and the gap between the transmitting signals is less than or equal to a predetermined value, the transmitting node may not perform LBT except upon the first transmission. The predetermined value may be a threshold. In the event LBT succeeds when a number of signals are transmitted continuously, the transmitting node may perform transmission without performing LBT for a predetermined period of time. When a plurality of transmitting signals are transmitted continuously, except for the first transmission, the timing for transmitting a signal may be determined based on the signal transmitted immediately before. For example, the next signal may start being transmitted X milliseconds after the end of the signal transmitted immediately before.

(3) The receiving node may detect the preamble signal. The receiving node may determine that a preamble is detected when the receiving power of the preamble signal is greater than or equal to a predetermined value.

(4) The receiving node may demodulate the transmitting signal upon detection of the preamble signal. The receiving node may specify the transmitting signal's resources based on the preamble signal detection result. The receiving node may specify the control signal's resources or detection opportunities (for example, a CORESET or search space) based on the detection result of the preamble signal, and perform blind detection for the control signal. Furthermore, the receiving node may demodulate the data signal upon detection of the control signal. The receiving node may specify the data and/or reference signal resources from the detection result of the control signal.

The method of cell search in above control rule A1, control rule A2, control rule B1, and control rule B2 needs to be considered now. For example, when a cell search is performed by using a synchronization signal that is transmitted periodically from the base station 10, such as NR SSB (SS/PBCH block), problems such as following (1) to (3) might arise.

(1) Narrow beams increase the number of beams used by the base station 10. Since the synchronization signals or reference signals to be transmitted increase in proportion to the number of beams the base station uses, the overhead of synchronization signals or reference signals increases.

(2) The number of connecting terminals per base station 10 becomes small due to deployment of smaller cells, and the mobility of terminals 20 also becomes low. Therefore, cell search and the synchronization signals required for cell search are needed at few timings, and therefore transmitting them periodically is inefficient.

(3) In the event TDD is employed, no other DL or UL transmission is allowed while synchronization signals are being transmitted. Therefore, the delay requirement cannot be satisfied.

It then becomes necessary to perform highly efficient cell search in a high frequency band.

Figure 8:
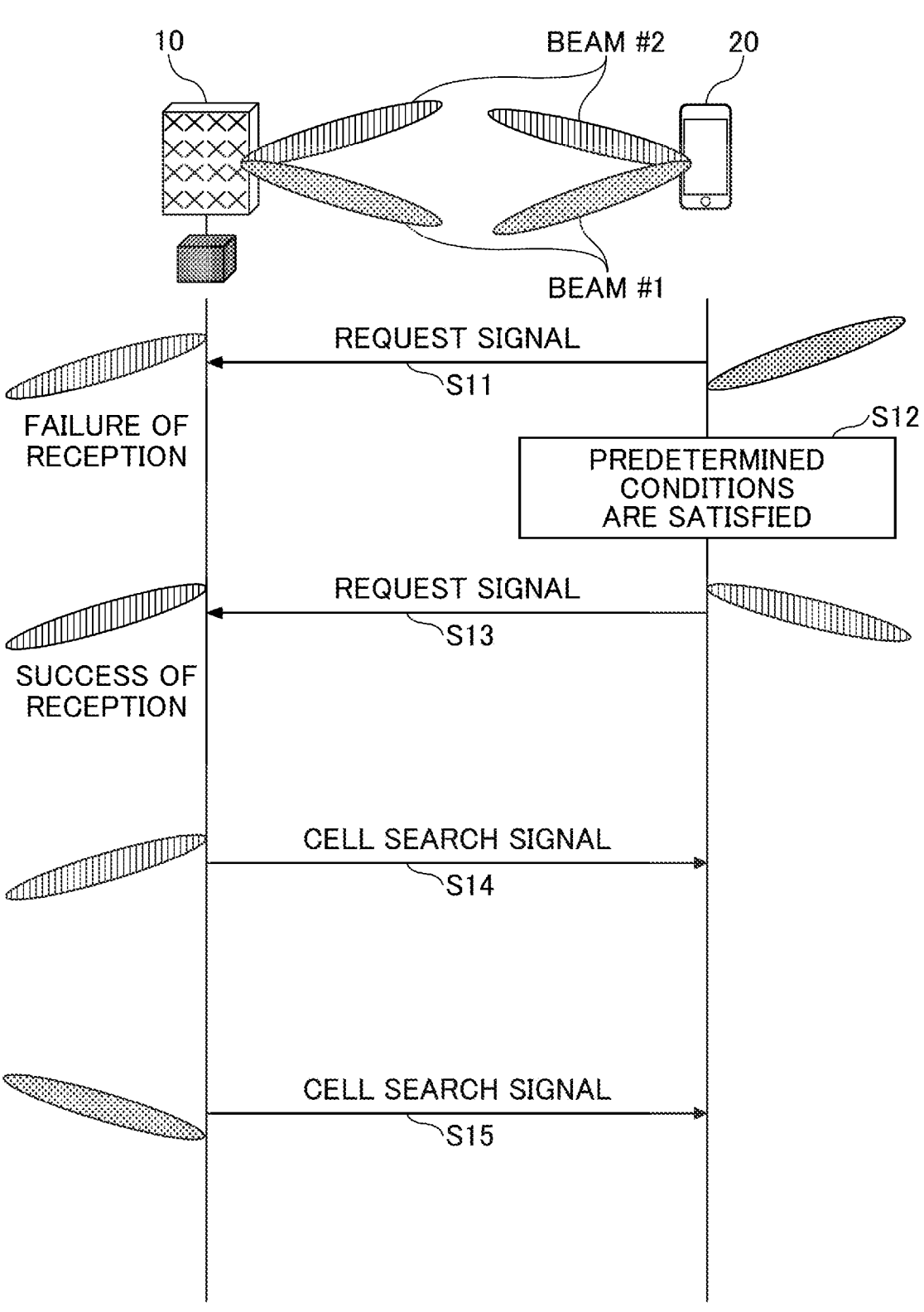
FIG. 8 is a sequence diagram for explaining an example of cell search according to an embodiment of the present invention.

FIG. 8 is a sequence diagram for explaining an example of cell search according to an embodiment of the present invention. As illustrated in FIG. 8, the terminal 20 may request the base station 10 to transmit signal for use in cell search. The terminal 20 may perform cell search by using the signal transmitted aperiodically from the base station 20 in response to the request. Here, "aperiodically" may mean that the signal is transmitted on an irregular basis, not periodically, that the signal is transmitted on a temporary basis, that the signal is not transmitted constantly, or that the signal is transmitted on a one-shot basis.

The terminal 20 may transmit a signal that requests to the base station 10 to transmit the signal for use in cell search. The radio resource (time, frequency, code, and space resource) of the requesting signal may be defined in the technical specifications, specified by another base station 10 that is already connected, or determined by the terminal 20.

When receiving the requesting signal, the base station 10 may transmit the signal for use in cell search. The radio resources (time and frequency resources) for the signal for use in cell search may be selected by the base station 10 from one or more candidates determined in advance, or may be determined by the base station 10 from among any resources. In the event the system employs LBT, the base station 10 may transmit the signal for use in cell search only when LBT succeeds, or transmit the signal for use in cell search without performing LBT. In the event the system attaches a preamble to a transmitting signal, the base station 10 may attach a preamble to the signal for use in cell search, or need not attach a preamble to the signal for use in cell search.

After transmitting the requesting signal, the terminal 20 may transmit the requesting signal (hereinafter also referred to as a "request signal") again if a predetermined condition is satisfied. The predetermined condition may be at least one of following (1) and (2):

(1) That the signal for use in cell search (hereinafter also referred to as a "cell search signal") is not successfully received in a predetermined time T1. This is when the base station fails to receive the request signal, or when the base station 10 is not located in the range in which the request signal can be received.

(2) That no request signal is transmitted in one or more predetermined UE beams (spatial filters) with predetermined transmission power, within a predetermined time T2. In other words, if a request signal is transmitted through beam sweeping with constant power or greater power within predetermined time T2, no more request signal is transmitted.

Note that at least one of the transmission power and the UE beam to apply to the retransmitting request signal may be different from that applied to the previously transmitted request signal. That is, power ramping and beam sweeping may be applied.

An example sequence of the above operation will be described with reference to FIG. 8. As illustrated in FIG. 8, the base station 10 and the terminal 20 employ a corresponding beam #1 and a corresponding beam #2. In step S11, the terminal 20 transmits a request signal to the base station 10 by using beam #1. Since the base station 10 receives signals through beam #2, the base station 10 fails to receive the request signal. In subsequent step S12, the terminal 20 moves on to step S13 when the above-mentioned predetermined condition is satisfied.

In step S13, the terminal 20 sends a request signal to the base station 10 by using beam #2. Since the base station 10 receives signals through beam #2, the base station 10 successfully receives the request signal. In subsequent step S14, the base station 10 transmits a cell search signal to the terminal 20 by using beam #2. In following step S15, the base station 10 may change the beam and transmit the cell search signal to the terminal 20 by using beam #1.

Also, when the location information of the terminal 20 satisfies a predetermined condition, the terminal 20 may transmit a signal to request transmission of the signal for use in cell search in one base station 10, from another base station 10 that is already connected. The predetermined condition may be that the first base station 10 is located within a radius of X m. The location information of the first base station 10 may be notified from the first base station 10, may be notified from another base station 10, or may be held in the terminal 20 in advance. The radio resource (time, frequency, code, and space) of the request signal may be defined in the technical specifications, configured from another, already-connected base station 10, configured from the first base station 10, or determined by the terminal 20. When the second base station 10 receives the request signal from the terminal 20, the reception of the request signal from the terminal 20 may be reported to the first base station 10. When the first base station receives the notice from another, already-connected base station 10, the first base station 10 may transmit the signal for use in cell search. When the location information of the first base station 10 is reported from the first base station 10 to the terminal 20, the terminal 20 may directly transmit the request signal to the first base station 10 when the predetermined condition is satisfied.

Figure 9:
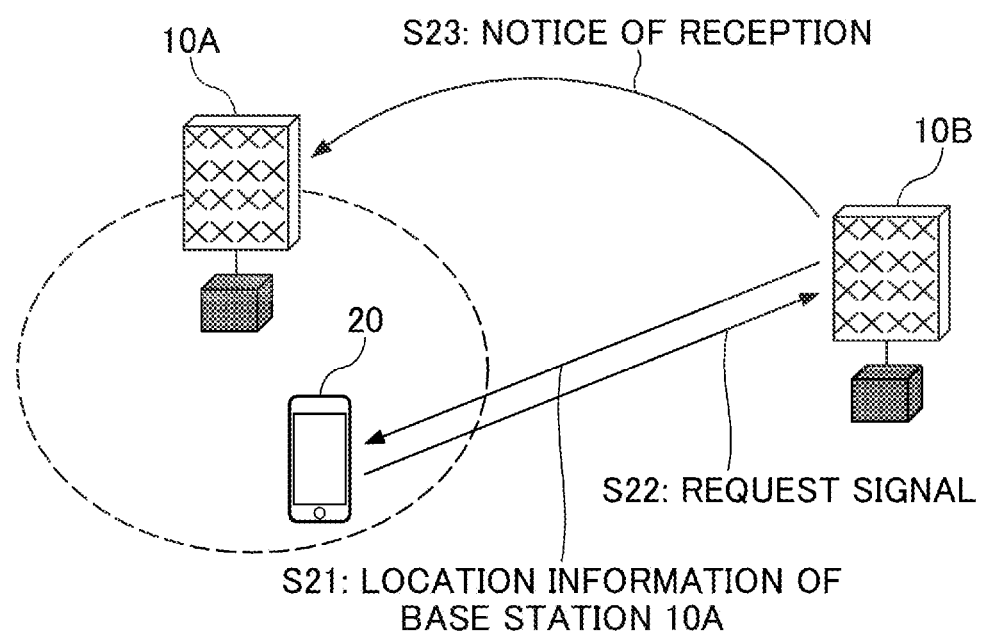
FIG. 9 is a diagram that illustrates an example (1) of requesting a cell search signal according to an embodiment of the present invention.

FIG. 9 is a diagram that illustrates an example (1) of requesting a cell search signal according to an embodiment of the present invention. As illustrated in FIG. 9, in step S21, the base station 10B sends the location information of the base station 10A to the terminal 20. From this location information and the location information of the terminal 20, the terminal 20 recognizes that it is possible to connect to the base station 10A. Note that step S21 need not be executed, and, instead, the terminal 20 may recognize that the base station 10A is located in a predetermined distance by other means.

In step S22, the terminal 20 transmits the request signal to the connected base station 10B. In step S23, the base station 10B reports the reception of the request signal from the terminal 20, to the base station 10A. The base station 10A may transmit the cell search signal based on this notice.

Figure 10:
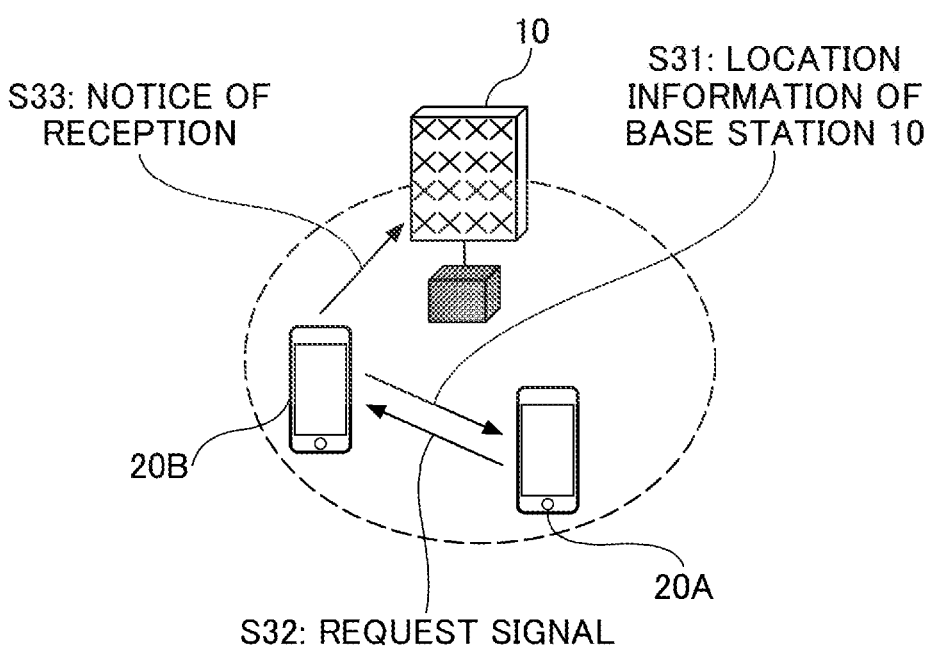
[FIG. 10]

FIG. 10 is a diagram that illustrates an example (2) of requesting a cell search signal according to an embodiment of the present invention. As illustrated in FIG. 10, in step S31, the terminal transmits location information of the base station 10 to the terminal 20A. Based on this location information and the location information of the terminal 20A, the terminal 20A recognizes that the above-mentioned predetermined condition is satisfied and that it is possible to connect to the base station 10. Note that step S31 need not be executed, and, instead, the terminal 20A may recognize that the base station 10 is located in a predetermined distance by other means.

In step S32, the terminal 20A transmits the request signal to the terminal 20B that is already connected. In step S33, the terminal 20B reports the reception of the request signal from the terminal 20A, to the base station 10. The base station 10 may transmit the cell search signal based on this notice.

Figure 11:
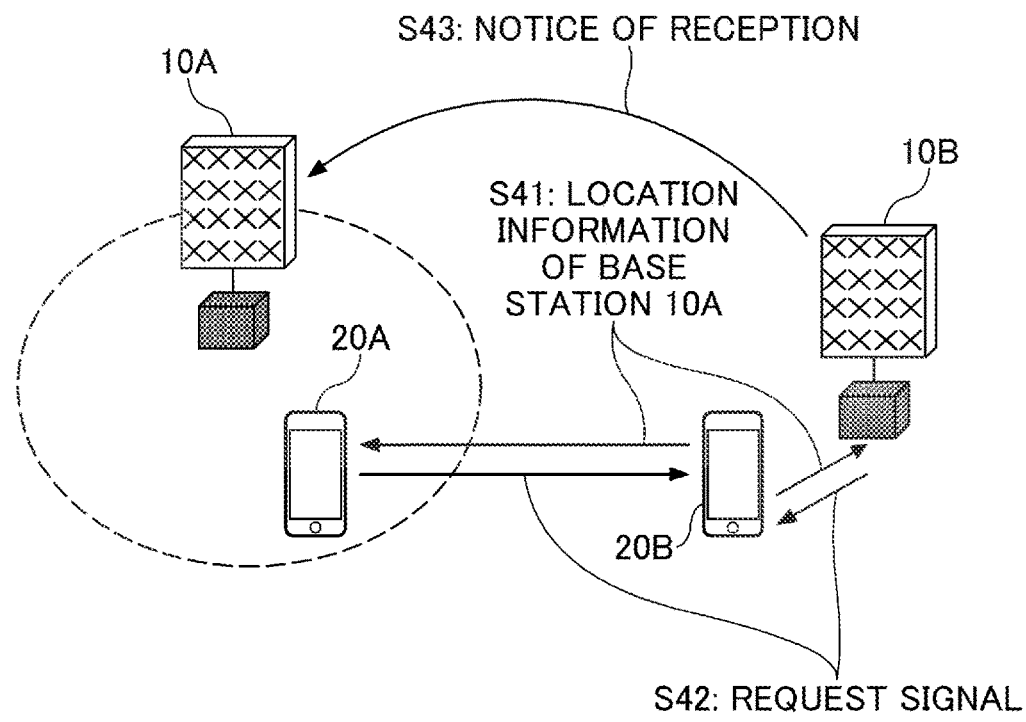
FIG. 11 is a diagram that illustrates an example (3) of requesting a cell search signal according to an embodiment of the present invention.

FIG. 11 is a diagram that illustrates an example (3) of requesting a cell search signal according to an embodiment of the present invention. As illustrated in FIG. 11, in step S41, the base station 10B transmits the location information of the base station 10A to the terminal 20A via the terminal 20B. Based on this location information and the location information of the terminal 20A, the terminal 20A recognizes that the above-mentioned predetermined condition is satisfied and that it is possible to connect to the base station 10. Note that step S41 need not be executed, and, instead, the terminal 20A may recognize that the base station 10 is located in a predetermined distance by other means.

In step S42, the terminal 20A transmits the request signal to the base station 10B via the terminal that is already connected. In step S43, the base station 10B reports the reception of the request signal from the terminal 20A, to the base station 10. The base station 10 may transmit the cell search signal based on this notice.

Also, when the terminal 20 fails to receive the periodic cell search signal, which will be described later, for a predetermined period of time, the terminal 20 may then perform a cell search by using a signal that is transmitted aperiodically from the base station 10. That is, the terminal 20 may trigger transmission of an aperiodic cell search signal. The predetermined period of time may be associated with the period of the cell search signal, or may be defined in the technical specifications. The technical specifications may define a receiving level threshold that is used to determine whether the cell search signal is received successfully or not.

After transmission of the cell search signal is triggered, the base station 10 may transmit the cell search signal continuously or non-continuously for a predetermined number of times, and stop the transmission. The predetermined number of times may be the number of base station beams.

Also, the terminal 20 may perform a cell search by using a signal that is transmitted periodically from the base station 10 in response to a request. "Periodically" here may mean that the signal is transmitted on a periodic basis, or that the signal is transmitted semi-persistently. The above-described operations related to the aperiodic cell search signal may be applied to the periodic cell search signal as well.

When the terminal 20 fails to receive the above-described aperiodic cell search signal successfully for a predetermined period of time, the terminal 20 may perform cell search by using the signal that is transmitted periodically from the base station 10. That is, the terminal 20 may trigger the periodic cell search signal. The predetermined period of time may be associated with the period of the cell search signal, or may be defined in the technical specifications. The technical specifications may define a receiving level threshold that is used to determine whether the periodic cell search signal is received successfully or not.

After transmission of the periodic cell search signal is triggered, the base station 10 may transmit the periodic cell search signal as in following (1) or (2):

(1) The base station 10 transmits the cell search signa periodically for a predetermined number of times (the predetermined number of times may be, for example, the number of base station beams), and stops the transmission.

(2) The base station 10 transmits the cell search signal periodically for a predetermined period of time, and stops the transmission. The predetermined period of time may be defined in the technical specifications, may be determined by the base station or may last until a timer expires. The timer may start when there is no longer any connecting terminal (by, for example, RRC connection) in the cell, and stop when a connecting terminal 20 appears in the cell.

The signal for use in cell search may be at least one of following (1) and (2):

(1) Cell-specific synchronization signal (for example, PSS or SSS).

Information about the cell may be specified from the signal sequence of the cell-specific synchronization signal. This signal may be used for purposes other than cell search, such as radio link monitoring (RLM), radio resource management (RRM), beam management, beam failure detection (BFD), beam failure recovery (BFR), and so forth.

(2) Broadcast signal (for example, PBCH (MIB), PDSCH (SIB), etc.).

Information about the cell may be specified from a specific bit field and/or a reference signal for demodulation of the broadcast signal (for example, a demodulation reference signal (DMRS)). The broadcast signal may include a broadcast signal 1 and a broadcast signal 2 described below:

Broadcast signal 1 (for example, MIB) may be subject to TDM, FDM, code division multiplexing (CDM), or space division multiplexing (SDM) with cell-specific synchronization signals. Information about the reception of broadcast signal 2 (for example, SIB) may be reported in broadcast signal 1. Information about the reception of broadcast signal 2 may be information about a signal (for example, a control signal) that indicates the resources of broadcast signal 2 (time resource and frequency resource). Also, the information about the reception of broadcast signal 2 may be resource information (the time resource and the frequency resource) of broadcast signal 2. Note that control signal or broadcast signal 2 may be transmitted with a preamble.

Also, the terminal 20 may assume that the signal for use in cell search is transmitted by using varying radio resources (time and frequency resources), in varying base station beams (spatial filters), or assume that the signal for use in cell search is transmitted by using the same base station beam. For example, in the event varying radio resources are used, the terminal 20 may assume that the cell search signal is transmitted with different transmission configuration indicators (TCIs), or transmitted with quasi-co-location (QCL) applied thereto.

Note that cell search may be an operation for specifying information about the cell corresponding to the base station 10 (for example, the cell ID), from the signals transmitted from the base station 10.

According to the above embodiment, in a system in which the base station 10 or the terminal 20 selects the resources for DL, UL, or SL transmission autonomously, cell search can be executed efficiently by using an aperiodic cell search signal or a periodic cell search signal.

In other words, signaling overhead can be reduced in a wireless communication system in which the resources to be used are determined autonomously.

(Device Structure)

Next, an example functional structure of the base station 10 and the terminal 20 for performing the processes and operations described above will be described. The base station 10 and the terminal 20 include functions for executing the embodiment described above. However, each of the base stations and the terminal 20 may include only part of the functions proposed above with respect to the embodiment.

<Base Station 10>

Figure 12:
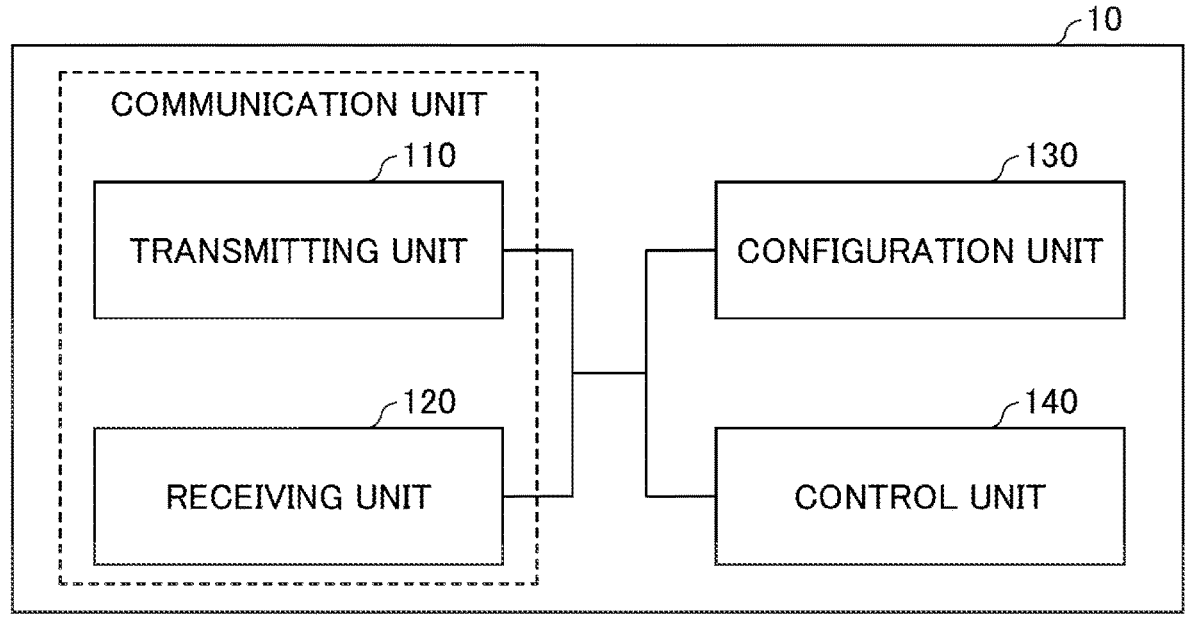
FIG. 12 is a diagram that illustrates an example functional structure of a base station 10 according to an embodiment of the present invention.

FIG. 12 is a diagram that illustrates an example functional structure of the base station 10. As illustrated in FIG. 12, the base station 10 includes a transmitting unit 110, a receiving unit 120, a configuration unit 130, and a control unit 140. The functional structure illustrated in FIG. 12 is only one example. If the operation according to the embodiment of the present invention can be performed, any functional categories and any functional unit names may be used. The transmitting unit 110 and the receiving unit 120 may be referred to as "communication units."

The transmitting unit 110 includes a function for generating signals to be transmitted to the terminal 20 side and transmitting the signals wirelessly. The receiving unit 120 includes a function of receiving various signals transmitted from the terminal 20 and acquiring, for example, higher layer information from the received signals. Also, the transmitting unit 110 has a function to transmit NR-PSS, NR-SSS, NR-PBCH, DL/UL control signals, DL data, and so forth, to the terminal 20. Furthermore, the transmitting unit 110 transmits the configuration information described in the embodiment and the like.

The configuration unit 130 stores configuration information that is prepared in advance and various configuration information to be transmitted to the terminal 20, in a storage device, and reads the information from the storage device as needed. The control unit 140 controls the entirety of the base station 10, including control related to signal transmission/reception, control related to LBT, and so forth. Note that a functional unit relating to signal transmission in the control unit 140 may be included in the transmitting unit 110, and a functional unit relating to signal reception in the control unit 140 may be included in the receiving unit 120. The transmitting unit 110 and the receiving unit 120 may be referred to as a "transmitter" and a "receiver," respectively.

<Terminal 20>

Figure 13:
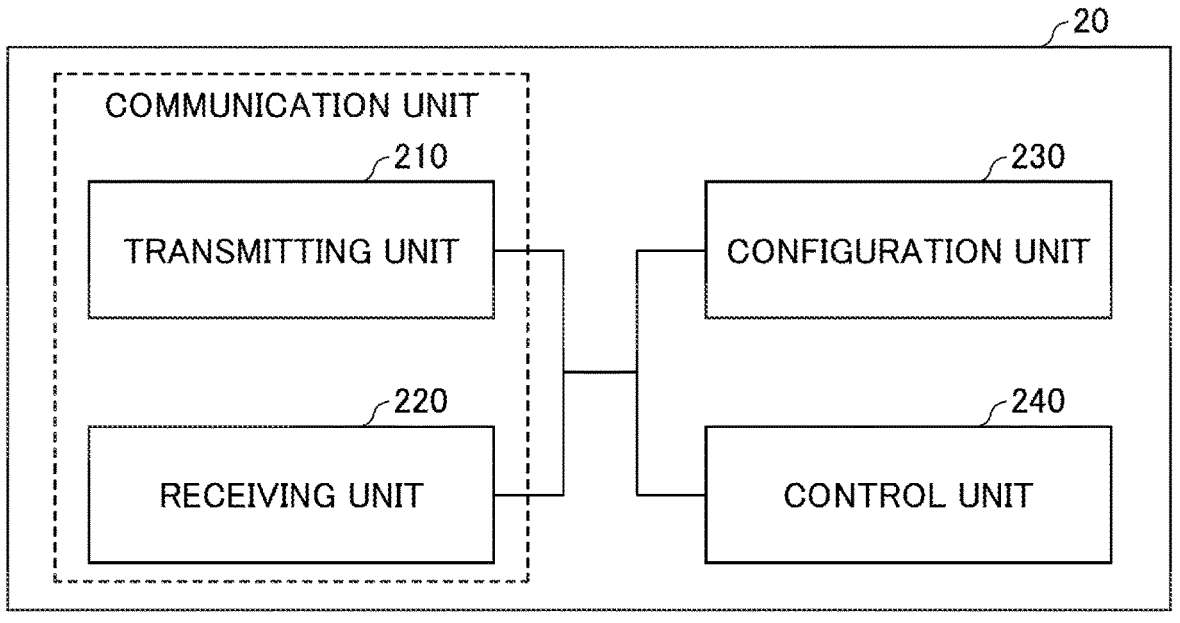
FIG. 13 is a diagram that illustrates an example functional structure of a terminal 20 according to an embodiment of the present invention.

FIG. 13 is a diagram that illustrates an example functional structure of the terminal 20. As illustrated in FIG. 13, the terminal 20 includes a transmitting unit 210, a receiving unit 220, a configuration unit 230, and a control unit 240. The functional structure illustrated in FIG. 13 is only one example. Insofar as the operation according to the embodiment of the present invention can be performed, any functional categories and functional unit names may be used. The transmitting unit 210 and the receiving unit 220 may be referred to as "communication units."

The transmitting unit 210 creates transmission signals from the transmission data and transmits the transmission signals wirelessly. The receiving unit 220 receives various signals wirelessly, and acquires signals of higher layers from the received signal of the physical layer. The transmitting unit 210 transmits HARQ-ACK, and the receiving unit 220 receives the configuration information described in the embodiment.

The configuration unit 230 stores various configuration information received from the base station 10 by the receiving unit 220 in the storage device, and reads the stored configuration information from the storage device as needed. The configuration unit 230 also stores the configuration information that is prepared in advance. The control unit 240 controls the entire terminal 20, including control relate to signal transmission and reception and control related to LBT. Note that a functional unit relating to signal transmission in the control unit 240 may be included in the transmitting unit 210, and a functional unit relating to signal reception in the control unit 240 may be included in the receiving unit 220. Also, the transmitting unit 210 and the receiving unit 220 may be referred to as a "transmitter" and a "receiver," respectively.

(Hardware Structure)

The block diagrams (FIG. 12 and FIG. 13) used in the description of the above embodiment illustrate blocks of functional units. These functional blocks (components) are implemented by any combination of hardware and/or software. In addition, the method of implementing each functional block is not particularly limited. That is, each functional block may be implemented by using a single device that is physically or logically combined, or two or more devices that are physically or logically separated may be directly or indirectly connected (for example, by using a cable, radio, etc.), and each functional block may be implemented using these multiple devices. The functional blocks may be implemented by combining software with the device or devices.

The functions include, but are not limited to, judgment, determination, decision, calculation, computation, processing, derivation, research, search, verification, reception, transmission, output, access, resolution, selection, choosing, establishment, comparison, assumption, expectation, deeming, broadcasting, notifying, communicating, forwarding, configuring, reconfiguring, allocating, mapping, and assigning. For example, a functional block (component) that works a transmission function is referred to as a "transmitting unit" or a "transmitter." In either case, as described above, the method of implementation is not particularly limited.

Figure 14:
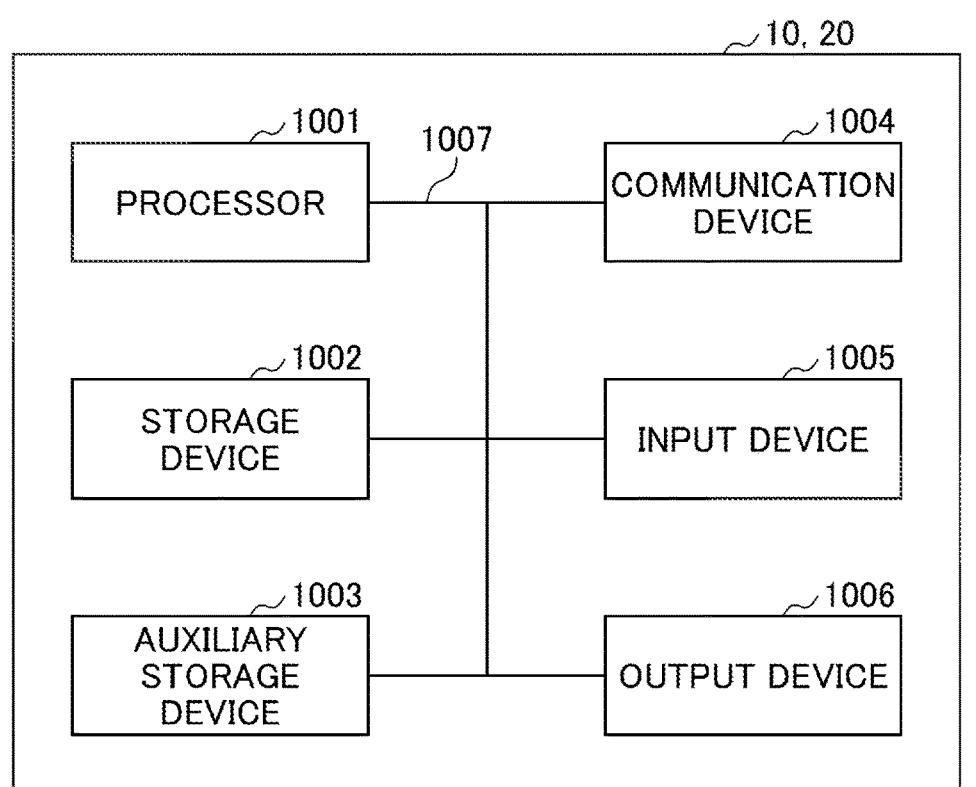
FIG. 14 is a diagram that illustrates an example hardware structure of the base station 10 or the terminal 20 according to an embodiment of the present invention.

For example, the base station 10, the terminal 20, and so forth according to the embodiment of the present disclosure may function as a computer for processing the wireless communication method of the present disclosure. FIG. 14 is a diagram that illustrates an example hardware structure of the base station 10 and the terminal 20 according to an embodiment of the present disclosure. The base station and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "device" can be read as circuit, apparatus, unit, and so forth. The hardware structure of the base station and the terminal 20 may be configured to include one or more of the devices illustrated in the drawings, or may be configured without some of the devices.

The functions of the base station 10 and the terminal 20 are realized by performing operations by the processor 1001 by reading predetermined software (programs) on hardware such as the processor 1001 and the storage device 1002, and controlling communication by the communication device 1004 and controlling at least one of reading and writing of data in the storage device 1002 and the auxiliary storage device 1003.

The processor 1001 operates, for example, an operating system to control the entire computer. The processor 1001 may be composed of a central processing unit (CPU) including an interface with peripheral devices, a control device, an arithmetic device, a register, and the like. For example, the above-described control unit 140, control unit 240, and the like may be implemented by the processor 1001.

The processor 1001 reads out programs (program codes), software modules, data, or the like from at least one of the auxiliary storage device 1003 and the communication device 1004 to the storage device 1002, and performs various processes in accordance with the above. As for the programs, programs that cause the computer to execute at least part of the operation described in the above embodiment may be used. For example, the control unit 140 of the base station 10 illustrated in FIG. 12 may be stored in the storage device 1002 and implemented by control programs operating in the processor 1001. For example, the control unit 240 of the terminal 20 illustrated in FIG. 13 may be stored in the storage device 1002 and implemented by control programs operating in the processor 1001. Although the foregoing processes have been described and executed by one processor 1001, they may be executed simultaneously or sequentially by two or more processors 1001. The processor 1001 may be implemented by one or more chips. The programs may be transmitted from the network via a telecommunication line.

The storage device 1002 is a computer-readable recording medium and may be composed of at least one of, for example, a read-only memory (ROM), an erasable programmable ROM (EPROM), an electrically erasable programmable ROM (EEPROM), a random access memory (RAM), and the like. The storage device 1002 may be referred to as a register, cache, main memory (main storage device), or the like. The storage device 1002 can store programs (program codes), software modules, and so forth, executable to implement the communication method according to the embodiment of the present disclosure.

The auxiliary storage device 1003 is a computer-readable recording medium and may be composed of at least one of an optical disk, such as a compact disc ROM (CD-ROM), a hard disk drive, a flexible disk, a magneto-optical disk (for example, a compact disc, a digital versatile disc, a Blu-ray disc (registered trademark), etc.), a smart card, a flash memory (for example, a card, a stick, a key drive), a floppy disk (registered trademark), a magnetic strip, and the like. The storage medium described above may be, for example, a database, a server, or other suitable medium that includes at least one of a storage device 1002 and an auxiliary storage device 1003.

The communication device 1004 is hardware (a transceiving device) for performing communication between computers via at least one of a wired network and a wireless network, and is also referred to as a "network device," a "network controller," a "network" card, a "communication module," or the like. The communication device 1004 may be composed of a high frequency switch, a duplexer, a filter, a frequency synthesizer, or the like, for example, to implement at least one of frequency division duplex (FDD) and time division duplex (TDD). For example, the transmitting/ receiving antenna, the amplifier unit, the transceiving unit, the transmission line interface, and the like may be implemented by the communication device 1004. The transceiving unit may be physically or logically isolated, respective implementations of a transmitting unit and a receiving unit.

The input device 1005 is an input device (for example, a keyboard, a mouse, a microphone, a switch, a button, a sensor, etc.) that accepts external input. The output device 1006 is an output device (for example, a display, a speaker, an LED lamp, etc.) that implements external output. The input device 1005 and the output device 1006 may have an integral structure (for example, a touch panel).

Each device, such as the processor 1001 and the storage device 1002, is connected by a bus 1007 for communicating information. The bus 1007 may be constructed using a single bus or may be constructed using different buses between devices.

The base station 10 and the terminal 20 may also include hardware such as a microprocessor, a digital signal processor (DSP), an application-specific integrated circuit (ASIC), a programmable logic device (PLD), a field programmable gate array (FPGA), and so forth, and some or all of the functional blocks may be implemented by the hardware. For example, the processor 1001 may be implemented using at least one of these hardware components.

Summary of Embodiment

As described above, according to the embodiment of the present invention, a terminal is provided. This terminal may have: a transmitting unit configured to transmit, to a communication device, a requesting signal that requests transmission of a cell search signal; and a receiving unit configured to receive the cell search signal transmitted based on the requesting signal and identify information related to a cell. According to the above structure, in a system in which a base station 10 or a terminal 20 selects the resources for DL, UL, or SL transmission autonomously, cell search can be performed efficiently by using an aperiodic cell search signal or a periodic cell search signal. That is, signaling overhead can be reduced in a wireless communication system in which the resources to be used are determined autonomously.

When the cell search signal is not receivable by the receiving unit in a certain period of time after the transmitting unit transmits the requesting signal, the transmitting unit may apply a beam that is different from a beam applied to the requesting signal, and transmit the requesting signal to the communication device again. According to this structure, in a system in which a base station 10 or a terminal 20 selects the resources for DL, UL, or SL transmission autonomously, cell search can be performed efficiently by using an aperiodic cell search signal or a periodic cell search signal.

The receiving unit may receive location information of a base station from the communication device; the terminal may further have a control unit configured to determine whether the terminal is located at a distance less than a threshold from the base station, based on the location information of the base station and location information of the terminal; and, when the control unit determines that the terminal is located at the distance less than the threshold from the base station, the transmitting unit may transmit the requesting signal to the communication device. According to this structure, in a system in which a base station 10 or a terminal 20 selects the resources for DL, UL, or SL transmission autonomously, cell search can be performed efficiently by using an aperiodic cell search signal or a periodic cell search signal.

The communication device may be the base station, or another base station or terminal. According to this structure, in a system in which a base station 10 or a terminal 20 selects the resources for DL, UL, or SL transmission autonomously, cell search can be performed efficiently by using an aperiodic cell search signal or a periodic cell search signal.

Furthermore, according to an embodiment of the present invention, a base station is provided. This base station may have: a receiving unit configured to receive a requesting signal that requests transmission of a cell search signal from a communication device; and a transmitting unit configured to transmit the cell search signal when the requesting signal is received.

According to the above structure, in a system in which a base station 10 or a terminal 20 selects the resources for DL, UL, or SL transmission autonomously, cell search can be performed efficiently by using an aperiodic cell search signal or a periodic cell search signal. That is, signaling overhead can be reduced in a wireless communication system in which the resources to be used are determined autonomously.

Furthermore, according to an embodiment of the present invention, a communication method to be performed by a terminal is provided. This communication method may include: transmitting a requesting signal that requests transmission of a cell search signal, to a communication device; and receiving the cell search signal transmitted based on the requesting signal and identify information related to a cell.

According to the above structure, in a system in which a base station 10 or a terminal 20 selects the resources for DL, UL, or SL transmission autonomously, cell search can be performed efficiently by using an aperiodic cell search signal or a periodic cell search signal. That is, signaling overhead can be reduced in a wireless communication system in which the resources to be used are determined autonomously.

Notes on Embodiment

An example embodiment of the present invention has been described above, but the disclosed invention is not limited to the above embodiment, and those skilled in the art would understand that there may be various modified examples, revised examples, alternative examples, substitution examples, and the like. In order to facilitate understanding of the invention, specific numerical values have been used for description, but the numerical values are merely examples, and any suitable values may be used unless otherwise specified. The classification of items in the above description is not essential to the present invention. Matters described as two or more items may be combined if necessary, and a matter described as one item may be applied to another item (as long as there is no contradiction). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiment, the order of the processes may be changed as long as there is no contradiction. For the sake of convenience of processing description, the base station 10 and the terminal 20 are described using functional block diagrams, but such devices may be implemented by hardware, software, or a combination thereof. Software executed by the processor included in the base station according to the embodiment of the present invention and software executed by the processor included in the terminal 20 according to the embodiment of the present invention may be stored in a random access memory (RAM), a flash memory, a read-only memory (ROM), an EPROM, an EEPROM, a register, an hard disk drive (HDD), a removable disk, a CD-ROM, a database, a server, or any other appropriate storage medium.

Furthermore, notification of information is not limited to the aspect or embodiment described in the present disclosure, and may be provided by using any other method. For example, the notification of information may be provided by physical layer signaling (for example, downlink control information (DCI) or uplink control information (UCI)), higher layer signaling (for example, radio resource control (RRC) signaling, medium access control (MAC) signaling, broadcast information (master information block (MIB), system information block (SIB), etc.), other signals, or a combination thereof. Furthermore, RRC signaling may be referred to as an "RRC message" and may be, for example, an RRC connection setup message, an RRC connection reconfiguration message, or the like.

Each aspect and embodiment described in the present disclosure may be applied to at least one of long-term evolution (LTE), LTE-advanced (LTE-A), SUPER 3G, IMT-Advanced, 4th generation mobile communication system (4G), 5th generation mobile communication system (5G), future radio access (FRA), new radio (NR), W-CDMA (registered trademark), GSM (registered trademark), CDMA 2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), a system using any other appropriate system, and next generation systems enhanced based on these standards. Furthermore, a plurality of systems (for example, a combination of at least one of LTE and LTE-A with 5G) may be combined to be applied.

The order of the processing procedures, the order of the sequences, the order of the flowcharts, and the like of the respective aspects/embodiments described in this specification may be changed, provided that there is no contradiction. For example, the method described in the present disclosure presents elements of various steps with an example order and is not limited to the presented, specific order.

In this specification, a specific operation to be performed by the base station 10 may be performed by an upper node in some cases. In the network including one or more network nodes including the base station 10, various operations performed for communication with the terminal 20 can be obviously performed by at least one of the base station 10 and any network node (for example, an MME, an S-GW, or the like is considered, but it is not limited thereto) other than the base station 10. A case has been shown above in which there is one network node other than the base station 10. The one network node may be a combination of a plurality of other network nodes (for example, MME and S-GW).

Information, a signal, or the like described in the present disclosure may be output from a higher layer (or from a lower layer) to a lower layer (or to a higher layer). Information, a signal, or the like described in the present disclosure may be input and output via a plurality of network nodes.

Input and output information and the like may be stored in a specific place (for example, a memory), or may be managed by using a management table. Input and output information and the like may be overwritten, updated, or additionally written. Output information and the like may be deleted. Input information and the like may be transmitted to other devices.

The determination in the present disclosure may be made in accordance with a value (0 or 1) represented by one bit, may be made in accordance with a Boolean value (Boolean: true or false), or may be made by a comparison of numerical values (for example, a comparison with a predetermined value).

Software should be broadly interpreted to mean a command, a command set, a code, a code segment, a program code, a program, a subprogram, a software module, an application, a software application, a software package, a routine, a subroutine, an object, an executable file, an execution thread, a procedure, a function, and the like, regardless of whether software is called "software," "firmware," "middleware," a "microcode," a "hardware description language," or any other name.

Furthermore, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL)) and a radio technology (such as infrared rays or a microwave), at least one of these wired technology and radio technology is included in a definition of a transmission medium.

Information, signals, and the like described in the present disclosure may be expressed using any one of a variety of different techniques. For example, data, instructions, commands, information, signals, bits, symbols, chips, and the like, which are mentioned throughout the above description, may be expressed by voltages, currents, electromagnetic waves, magnetic fields or magnetic particles, optical fields or photons, or any combination thereof.

The terms described in the present disclosure and terms necessary for understanding the present disclosure may be replaced with terms having the same or similar meanings. For example, at least one of a channel and a symbol may be a signal (signaling). Furthermore, a signal may be a message. Furthermore, a component carrier (CC) may be referred to as a "carrier frequency," a "cell," a "frequency carrier," or the like.

The terms "system" and "network" used in the present disclosure are interchangeable.

Furthermore, the information, parameters, and the like described in the present disclosure may be expressed by using absolute values, may be expressed by using relative values from predetermined values, or may be expressed by using any other corresponding information. For example, the radio resources may be those indicated by indices.

The names used for the above-described parameters are not limited names in any point of view. Furthermore, mathematical formulas or the like using the parameters may be different from those explicitly disclosed in the present disclosure. Since various channels (for example, PUCCH, PDCCH, etc.) and information elements can be identified by any suitable names, various names assigned to the various channels and the information elements are not limited names in any point of view.

In the present disclosure, the terms "base station (BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like can be used interchangeably. The base station may also be referred to by a term such as a "macrocell," a "small cell," a "femtocell," and a "picocell."

The base station can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (RRH: Remote Radio Head)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be referred to, by a person ordinarily skilled in the art, as a "subscriber station," a "mobile unit," a "subscriber unit," a "wireless unit," a "remote unit," a "mobile device," a "wireless device," a "wireless communication device," a "remote device," a "mobile subscriber station," an "access terminal," a "mobile terminal," a "wireless terminal," a "remote terminal," a "handset," a "user agent," a "mobile client," a "client," or some other suitable terms.

At least one of the base station and the mobile station may be also referred to as a "transmission device," a "receiving device," a "communication device," or the like. At least one of the base station and the mobile station may be a device installed in a mobile body, a mobile body itself, or the like. The mobile body may be a vehicle (for example, a car, an airplane, etc.), an unmanned body that moves (for example, a drone, an autonomous car or the like), or a robot (manned type or unmanned type). At least one of the base station and the mobile station includes a device that need not move during communication operation. For example, at least one of the base station and the mobile station may be an Internet of Things (IoT) device such as a sensor.

Furthermore, the base station in the present disclosure may be replaced by the user terminal. For example, various aspects/embodiments of the present disclosure may be applied to a configuration in which communication between the base station and the user terminal is replaced by communication between multiple terminals 20 (such communication may be referred to as "device-to-device (D2D)," "vehicle-to-everything (V2X)," etc.). In this case, the terminals 20 may have and perform the functions the base station 10 described above has. The phrases "uplink" and "downlink" may also be replaced by phrases corresponding to terminal-to-terminal communication (for example, "side"). For example, an uplink channel, a downlink channel, or the like may be replaced by a side channel.

Similarly, the user terminal in the present disclosure may be replaced with the base station. In this case, the base station may have the functions of the above-described user terminal.

The terms "determination (determining)" and "decision (determining)" used in the present specification may include various types of operations. The "determination" and "decision" may include deeming "judging," "calculating," "computing," "processing," "deriving," "investigating," "looking up (for example, searching in a table, a database, or another data structure)," "searching," "inquiring," or "ascertaining" as "determining" and/or "deciding." Furthermore, the "determination" and "decision" may include deeming "receiving (for example, receiving information)," "transmitting (for example, transmitting information)," "inputting," "outputting," or "accessing (for example, accessing data in a memory)" as "determining" and/or "deciding." Furthermore, the "determination" and "decision" may include deeming "resolving," "selecting," "choosing," "establishing," or "comparing" as "determining" and/or "deciding." Namely, the "determination" and "decision" may include deeming an operation as "determining" and/or "deciding." Furthermore, "determining" may be replaced with "assuming," "expecting," "considering," or the like.

The terms "connected," "coupled," or variations thereof may mean any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case of using in the present disclosure, two elements may be considered to be "connected" or "coupled" with each other using at least one of one or more electric wires, cables and/or a printed electrical connection or using electromagnetic energy having a wavelength in a radio frequency region, a microwave region, or a light (both visible and non-visible) region as non-limiting and non-exhaustive examples.

A reference signal may be abbreviated as "RS" and may be referred to as a "pilot," depending on the standard that is applied.

The phrase "based on" used in the present disclosure does not only mean "based only on," unless otherwise stated. In other words, the phrase "based on" means both "based only on" and "based at least on."

Any reference to an element using a designation such as "first" or "second," used in the present disclosure, does not generally restrict quantities or the order of those elements. Such designation can be used in the present disclosure as a convenient method of distinguishing between two or more elements. Thus, reference to the first and second elements does not mean that only two elements can be adopted there, or the first element must precede the second element in a certain way.

Furthermore, "means" in the structure of each of the above devices may be replaced with "unit," "circuit," "device," or the like.

When "include," "including," and variations thereof are used in the present disclosure, these terms are intended to be comprehensive, similar to the term "provided with (comprising)." Furthermore, the term "or" used in the present disclosure is intended not to be an exclusive OR.

A radio frame may include one or more frames in the time domain. In the time domain, each of one or more frames may be referred to as a "subframe." The subframe may further include one or more slots in the time domain. The subframe may have a fixed time length (for example, 1 ms) not depending on numerology.

Numerology may be a communication parameter applied to at least one of transmission and reception of a certain signal or channel. For example, numerology may indicate at least one of subcarrier spacing (SCS), the bandwidth, the symbol length, the cyclic prefix length, the transmission time interval (TTI), the number of symbols per TTI, the radio frame structure, a specific filtering process performed in the frequency domain by a transceiver, a specific windowing process performed in the time domain by a transceiver, and the like.

A slot may include one or more symbols (orthogonal frequency division multiplexing (OFDM) symbols, single carrier frequency division multiple access (SC-FDMA) symbols, etc.) in the time domain. A slot may be a time unit based on numerology.

A slot may include a plurality of mini slots. Each mini slot may include one or more symbols in the time domain. Furthermore, a mini slot may be referred to as a "sub-slot." A mini slot may include fewer symbols than a slot. PDSCH (or PUSCH) that is transmitted in a unit of time greater than a mini slot may be referred to as "PDSCH (or PUSCH) mapping type A." PDSCH (or PUSCH) that is transmitted using a mini slot may be referred to as "PDSCH (or PUSCH) mapping type B."

Any one of a radio frame, a subframe, a slot, a mini slot, and a symbol indicates a time unit for transmitting a signal. As a radio frame, a subframe, a slot, a mini slot, and a symbol, different names corresponding to them may be used.

For example, one subframe may be referred to as a "transmission time interval (TTI)," or a plurality of consecutive subframes may be referred to as a "TTI," or one slot or one mini slot may be referred to as a "TTI." In other words, at least one of the subframe and the TTI may be a subframe (1 ms) in conventional LTE, may be a period shorter than 1 ms (for example, 1 to 13 symbols), or may be a period longer than 1 ms. A unit representing the TTI may be referred to as a "slot," a "mini slot," or the like, instead of a "subframe."

Here, for example, the TTI refers to a minimum time unit of scheduling in wireless communication. For example, in an LTE system, the base station performs scheduling of allocating radio resources (frequency bandwidth, transmission power, or the like which can be used in each terminal 20) to each terminal 20 in units of TTIs. The definition of the TTI is not limited thereto.

The TTI may be a transmission time unit such as a channel-coded data packet (transport block), a code block, or a codeword, or may be a processing unit of, for example, scheduling or link adaptation. Furthermore, when a TTI is provided, the time interval (for example, the number of symbols) in which a transport block, a code block, a codeword, or the like is actually mapped may be shorter than the TTI.

When one slot or one mini slot is referred to as a "TTI," one or more TTIs (that is, one or more slots or one or more mini slots) may be a minimum time unit of scheduling. Furthermore, the number of slots (the number of mini slots) forming the minimum time unit of scheduling may be controlled.

A TTI having a time length of 1 ms may be referred to as a "common TTI" (TTI in LTE Rel. 8 to 12), a "normal TTI," a "long TTI," a "common subframe," a "normal subframe," a "long subframe," a "slot," or the like. A TTI shorter than a common TTI may be referred to as a "reduced TTI," a "short TTI," a "partial TTI" (a partial or fractional TTI), a "reduced subframe," a "short subframe," a "mini slot," a "sub slot," a "slot," or the like.

Furthermore, a long TTI (for example, a normal TTI, a subframe, etc.) may be replaced with a TTI having a time length exceeding 1 ms, and a short TTI (for example, a reduced TTI or the like) may be replaced with a TTI having a TTI length that is shorter than a TTI length of a long TTI and that is longer than or equal to 1 ms.

The resource block (RB) is a resource allocation unit in the time domain and the frequency domain, and may include one or more consecutive subcarriers in the frequency domain. The number of subcarriers included in an RB may be the same, irrespective of the numerology and may be, for example, 12. The number of subcarriers included in an RB may be determined based on numerology.

Furthermore, the time range of an RB may include one or more symbols and may have a length of one slot, one mini slot, one subframe, or one TTI. One TTI, one subframe, or the like may be formed with one or more resource blocks.

Furthermore, one or more RBs may be referred to as a "physical resource block (PRB)," a "subcarrier group (SCG)," a "resource element group (REG)," a "PRB pair," an "RB pair," or the like.

Furthermore, a resource block may be formed with one or more resource elements (REs). For example, one RE may be a radio resource field of one subcarrier and one symbol.

A bandwidth part (BWP) (which may be referred to as a "partial bandwidth" or the like) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include BWP for UL (UL BWP) and BWP for DL (DL BWP). In the terminal 20, one or more BWPs may be configured in one carrier.

At least one of configured BWPs may be active, and the terminal 20 need not assume that predetermined signals/channels are transmitted and received outside an active BWP. Furthermore, a "cell," a "carrier," or the like in the present disclosure may be replaced with a "BWP."

Structures of the radio frame, the subframe, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the cyclic prefix (CP) length, and the like can be variously changed.

In the present disclosure, for example, when an article such as "a," "an," or "the" in English is added by a translation, the present disclosure may include a case in which a noun following the article is the plural.

In the present disclosure, "A and B are different" may mean "A and B are different from each other." However, this may also mean "A and B are different from C." Terms such as "separated" or "combined" may be interpreted as well as "different."

Each aspect/embodiment described in the present disclosure may be used alone, in combination, or may be switched in accordance with the implementation. Furthermore, notification of predetermined information (for example, notification of "being X") is not limited to notification performed explicitly, but may be performed implicitly (for example, not notifying the predetermined information). Note that, in the present disclosure, the base station 10 and the terminal 20, or the transmitting node and the receiving node are examples of communication devices. CSI-RS is an example of a CSI reference signal.

Although the present disclosure has been described above in detail, it is obvious to those skilled in the art that the present disclosure is not limited to the embodiment described in the present disclosure. The present disclosure may be implemented as revised and modified embodiments without departing from the gist and scope of the present disclosure as set forth in the accompanying claims. Accordingly, the description of the present disclosure is for the purpose of illustration and does not have any restrictive meaning to the present disclosure.

DESCRIPTION OF THE REFERENCE NUMERALS

10 base station
110 transmitting unit
120 receiving unit
130 configuration unit
140 control unit
20 terminal
210 transmitting unit
220 receiving unit
230 configuration unit
240 control unit
30 core network
1001 processor
1002 storage device
1003 auxiliary storage device
1004 communication device
1005 input device
1006 output device

The invention claimed is:

1. A terminal comprising:
a transmitter configured to transmit, to a communication device, a requesting signal that requests transmission of a cell search signal; and
a receiver configured to receive the cell search signal transmitted based on the requesting signal and identify information related to a cell,
wherein the receiver receives location information of a base station from the communication device,
wherein the terminal further comprises a processor configured to determine whether the terminal is located at a distance less than a threshold from the base station, based on the location information of the base station and location information of the terminal, and
wherein, when the processor determines that the terminal is located at the distance less than the threshold from the base station, the transmitter transmits the requesting signal to the communication device.

2. The terminal according to claim 1, wherein, when the cell search signal is not receivable by the receiver in a certain period of time after the transmitter transmits the requesting signal, the transmitter applies a beam that is different from a beam applied to the requesting signal, and transmits the requesting signal to the communication device again.

3. The terminal according to claim 1, wherein the communication device is the base station, or another base station or terminal.

4. A base station comprising:
a receiver configured to receive a requesting signal that requests transmission of a cell search signal from a communication device that has received the request from a terminal; and
a transmitter configured to transmit, to the terminal, the cell search signal when the requesting signal is received,
wherein, when the receiver receives the requesting signal from the communication device, the base station is configured to assume that the terminal is located at a distance less than a threshold from the base station.

5. A communication method to be performed by a terminal, the method comprising:

transmitting a requesting signal that requests transmission of a cell search signal, to a communication device;

receiving the cell search signal transmitted based on the requesting signal and identifying information related to a cell;

receiving location information of a base station from the communication device;

determining whether the terminal is located at a distance less than a threshold from the base station, based on the location information of the base station and location information of the terminal; and transmitting, when it is determined that the terminal is located at the distance less than the threshold from the base station, the requesting signal to the communication device.

* * * * *